United States Patent [19]

Beigang et al.

[11] Patent Number: 5,273,147
[45] Date of Patent: Dec. 28, 1993

[54] SELF-LOCKING FREEWHEELING UNIT OPERATED BY CENTRIFUGAL FORCES

[76] Inventors: Wolfgang Beigang, Felderhoferbrücke 24, D-5207 Ruppichteroth; Adrian Chludek, Wismarer Strasse, D-5205 St. Augustin, both of Fed. Rep. of Germany

[21] Appl. No.: 750,459

[22] Filed: Aug. 27, 1991

[30] Foreign Application Priority Data

Aug. 28, 1990 [DE] Fed. Rep. of Germany ....... 4027209

[51] Int. Cl.$^5$ ............................................. F16D 43/24
[52] U.S. Cl. ................................. 192/104 B; 192/48.6; 192/74; 192/103 B; 192/104 C; 192/105 BB
[58] Field of Search ............ 192/104 B, 104 C, 103 B, 192/105 BB, 105 B, 71, 74, 93 C, 48.6, 48.92, 48.3, 48.8

[56] References Cited

U.S. PATENT DOCUMENTS

| | | | |
|---|---|---|---|
| 1,969,561 | 8/1934 | Keller | 192/48.6 X |
| 2,020,040 | 11/1935 | Rallen | 192/48.6 |
| 2,367,390 | 1/1945 | Firth et al. | 192/93 C |
| 2,429,091 | 10/1947 | Dodge et al. | 192/104 C |
| 2,464,675 | 3/1949 | Dodge | 192/104 C X |
| 2,493,232 | 1/1950 | Dodge | 192/104 C X |
| 2,678,117 | 5/1954 | Birbaum | 192/48.92 X |
| 2,721,639 | 10/1955 | Miller | 192/105 B X |
| 3,757,593 | 9/1973 | Svenson | 192/48.92 X |
| 3,762,519 | 10/1973 | Bentley | 192/105 B X |
| 3,935,749 | 2/1976 | Groves | 192/104 C X |
| 4,460,078 | 7/1984 | Heide et al. | 192/71 X |
| 4,494,637 | 1/1985 | Gotoda et al. | 192/48.6 |
| 4,883,152 | 11/1989 | Froment | 192/48.92 X |

FOREIGN PATENT DOCUMENTS

| | | |
|---|---|---|
| 1137636 | 10/1962 | Fed. Rep. of Germany . |
| 3708193 | 10/1987 | Fed. Rep. of Germany . |
| 2042977 | 10/1980 | United Kingdom . |
| 2073338 | 10/1981 | United Kingdom ............. 192/48.92 |
| 2208697 | 4/1989 | United Kingdom . |

*Primary Examiner*—Leslie A. Braun
*Assistant Examiner*—Andrea Pitts
*Attorney, Agent, or Firm*—Harness, Dickey & Pierce

[57] ABSTRACT

The invention relates to a locking device 4 for a freewheeling unit 1 of a non-directly driven axle of a motor vehicle driven by a directly driven axle. To lock the freewheeling unit 1 there is provided a first drive element 2 with a number of circumferentially distributed apertures 15 holding radially displaceable locking elements 16. The locking elements, for the purpose of establishing a non-rotating connection between the first drive element 2 and the second drive element 3, may partially enter recesses 17 of the second drive element 3 corresponding to the apertures. Radial displacement of the locking elements 16 is achieved by a spring loaded axially movable control element 10. Displacement of the control element 10 is achieved by radially outward displacement of centrifugal masses 20.

15 Claims, 4 Drawing Sheets

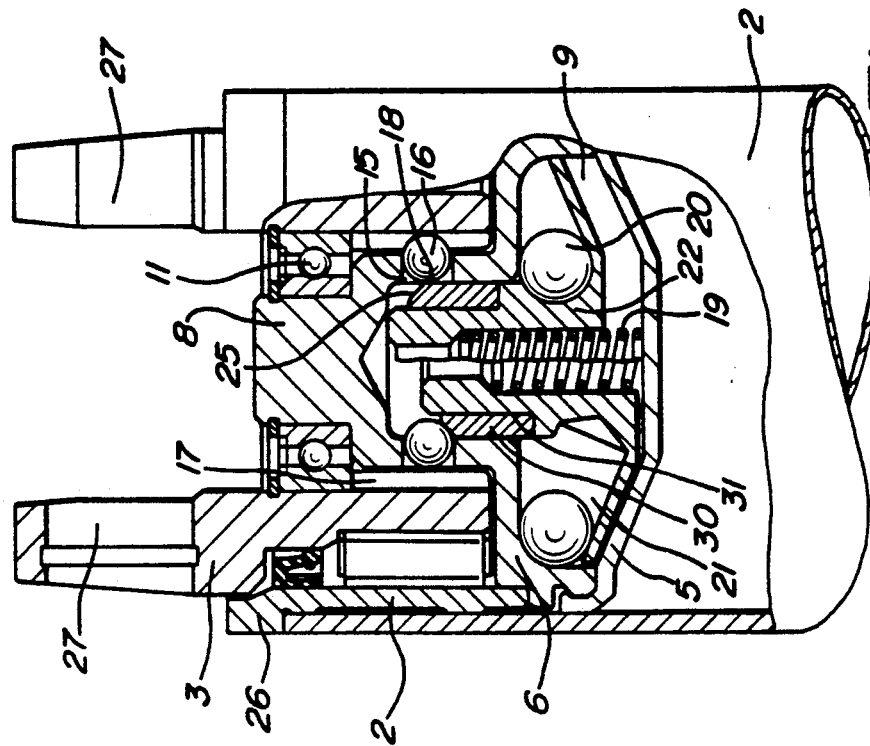
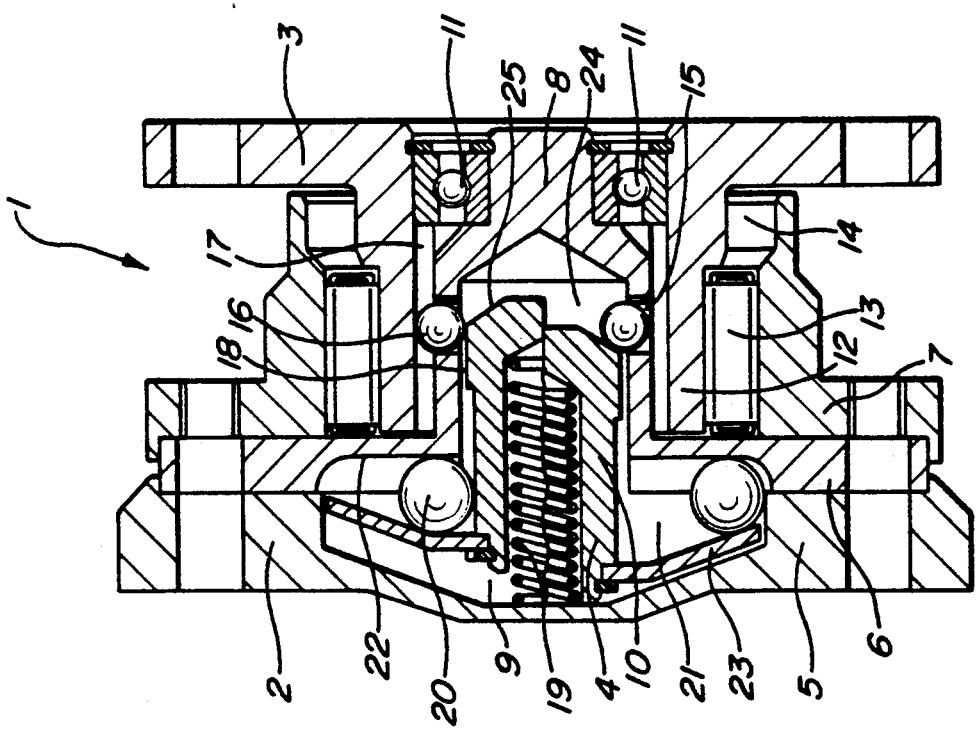

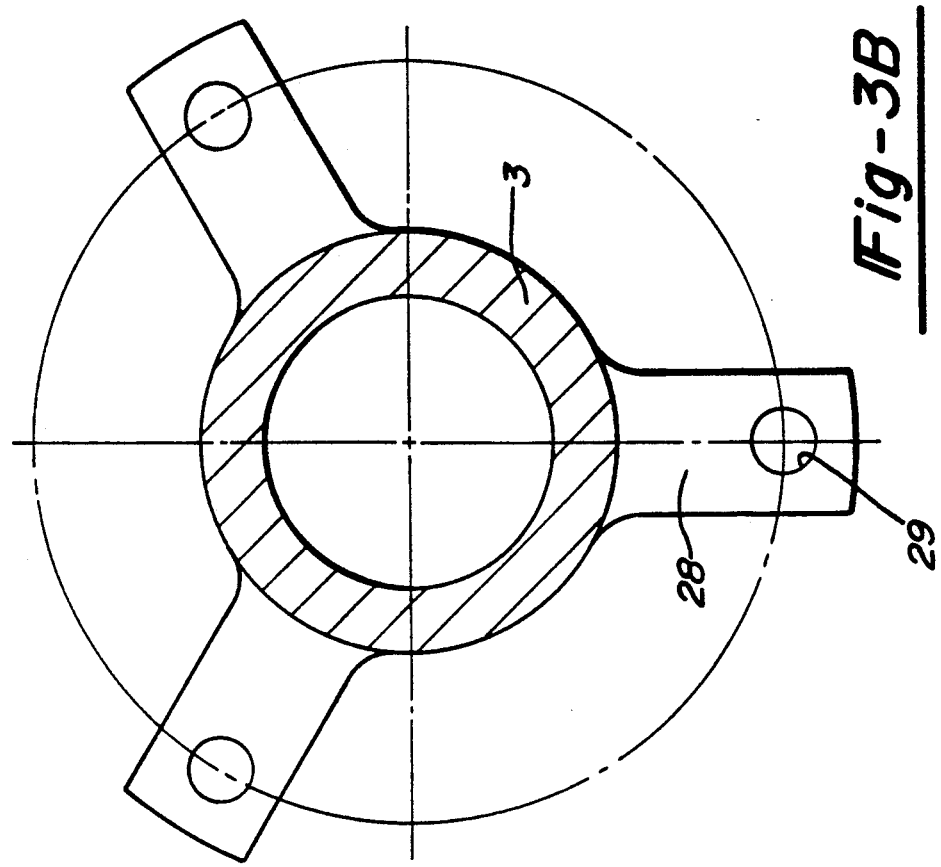
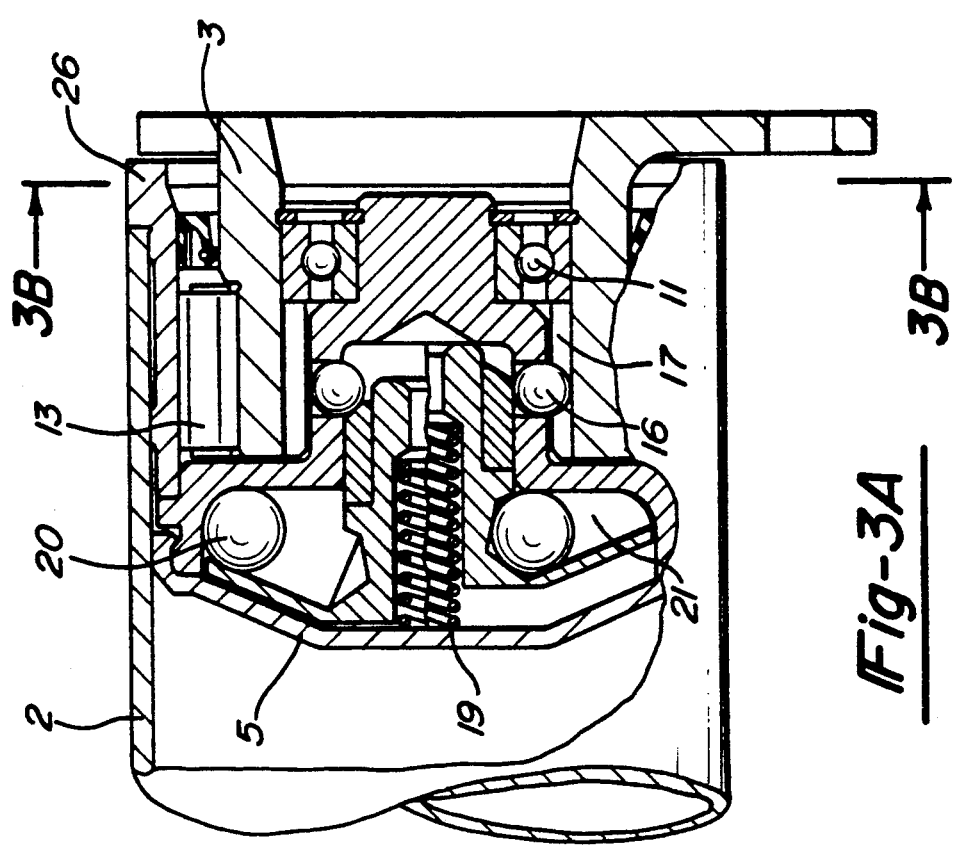

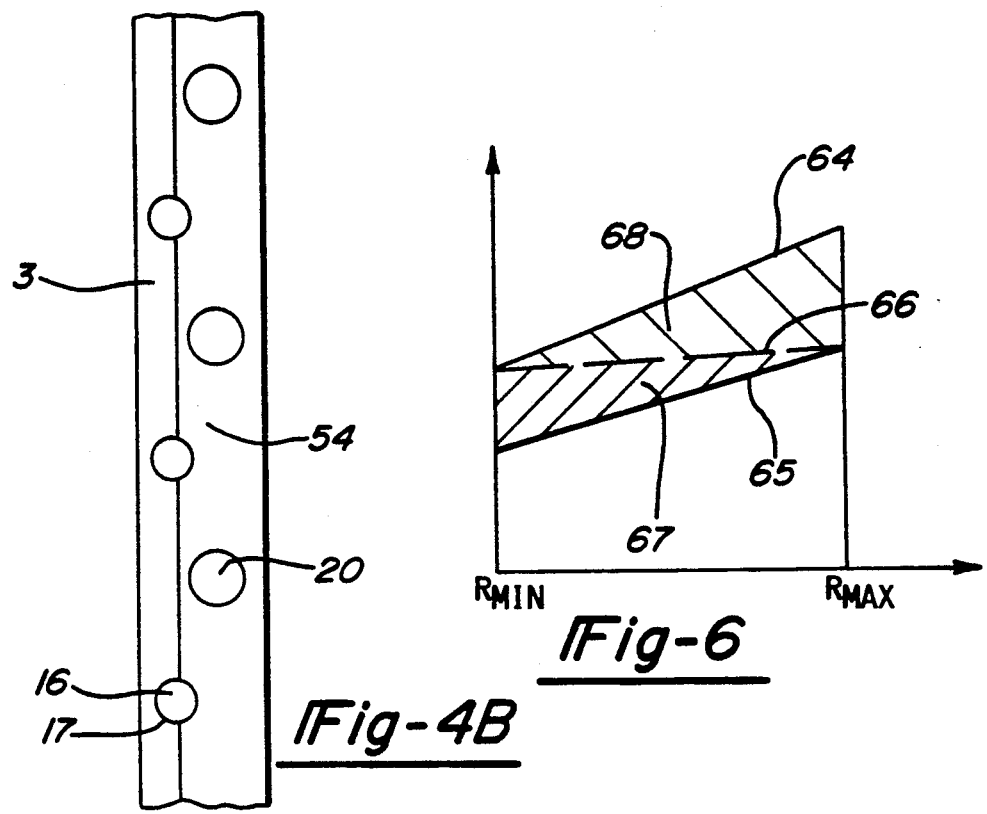
Fig-4B
Fig-6
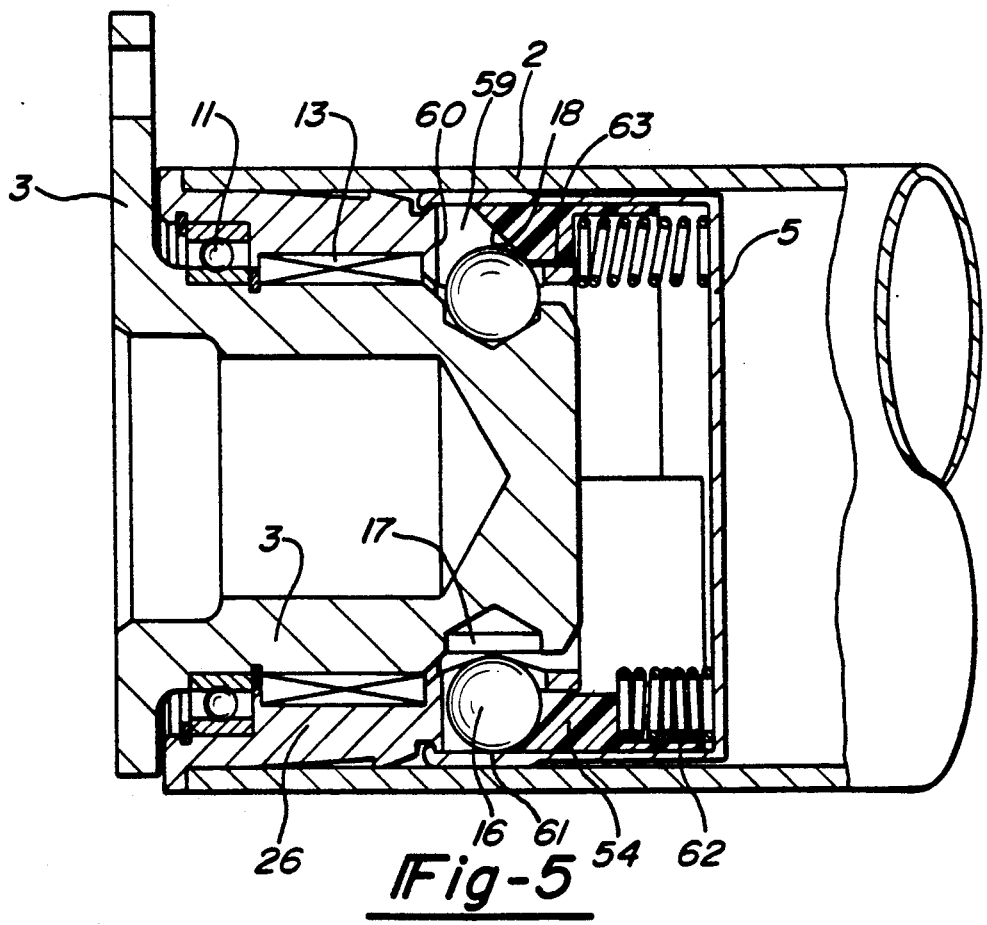
Fig-5

SELF-LOCKING FREEWHEELING UNIT OPERATED BY CENTRIFUGAL FORCES

BACKGROUND AND SUMMARY OF THE INVENTION

The invention relates to a device for locking a freewheeling unit. Further in vehicles with a drive unit to transmit torque from a first driving axle to a second driving axle, the system includes at least one freewheeling unit and a slip coupling connecting the axles. A freewheeling unit includes a first drive element, connected to the drive unit and a second drive element, connected to the rear axle. The freewheeling unit in its unlocked operating condition, enables the wheels of the front axle to overtake the wheels of the rear axle.

Four wheel drive vehicles frequently comprise a directly driven axle, normally the front axle, and a non-directly driven rear axle. If a speed differential occurs between the two axles, the non-directly driven axle is torque-loaded via a slip coupling. Slip couplings suitable for this purpose are viscous couplings, for example, which in this arrangement are also referred to as viscous transmissions.

Other suitable couplings are based on a pumping effect. Furthermore, there are prior art four wheel drives which, in an axle differential in the non-directly driven axle, is arranged with two slip couplings in a drivable housing. The couplings in this arrangement are referred to as torque splitters with the respective second coupling halves being connected to one of the axle shafts, respectively. Also in this arrangement, a torque is transmitted to the non-directly driven axle if there is a speed differential between the two axles, with at the same time the slip couplings replacing the differential.

With the drive systems mentioned here and with a direct connection of the axles via the coupling, torque would also be transmitted from the non-directly driven axle to the directly driven axle. Generally this occurs during braking when there is a speed differential between a locking front axle and the rear axle. Even when using an anti-lock braking system, there occurs a speed differential between the front and the rear axle due to driving stability and that the circumferential slip of the rear wheels with respect to the ground is kept smaller than the circumferential slip of the front wheels.

DE-OS No. 37 08 193 illustrates integration of a freewheeling device with a freewheeling lock on the propeller shaft. The device, in its unlocked condition, permits a higher speed of the rear axle wheels as compared to the front axle wheels; i.e. it permits overtaking of the rear wheels with respect to the front wheels. During normal driving conditions, the freewheeling unit is locked, with unlocking being effected by actuation of the vehicle brakes. Thus, during the braking operation, the rear wheels are allowed to overtake. The disadvantage of this system is that control of the freewheeling unit is only possible during actuation of the brake pedal.

U.S. Pat. No. 4,889,353 proposes a drive unit which transmits torque between a rotating input and output shaft. The patent shows a coupling which ensures the transmission of torque from the input shaft to the output shaft and vice versa within a low speed range and which, in a higher speed range, permits torque only to be transmitted from the input shaft to the output shaft. However, this design involves a lockable drive unit and is complicated and expensive.

DE-AS No. 11 37 636 illustrates a semi-automatic motor vehicle coupling consisting of a separating coupling and a centrifugal force coupling including a freewheeling unit arranged at the hub extension of the flywheel. To improve the support of the two couplings inside each other and to improve the arrangement of the freewheeling lock, it is proposed to separate the coupling, via a roller bearing, at the same time the freewheeling lock is supported on the outer casing of the hub extension of the flywheel of the centrifugal force coupling. The flywheel is centered on and connected to the crankshaft with the centrifugal weights supported relative to the coupling housing. This reference, however, does not teach locking of the centrifugal weights.

It is the object of the present invention to provide a freewheeling unit which is effective in one direction of rotation and which, as a function of the number of revolutions driving it, enables automatic locking in order to enable both axles to be driven during reversing (driving backwards).

In accordance with the invention, the objective is achieved by a first drive element with at least one circumferentially distributed aperture. A locking element, which is radially displaceable for the purpose of establishing a non-rotating connection between the first and second drive element, is positioned in the aperture. The locking element is partially transferred into at least one recess of the second drive element which corresponds to the aperture to establish the non-rotating connection. An axially movable spring-loaded control element, with a locking face to displace the locking elements, is arranged coaxially relative to the drive elements. The control element, which is axially movable by radial displacement of centrifugal masses when a predetermined nominal speed is exceeded, releases the locking elements, and thus the non-rotating connection between the drive elements. When the freewheeling unit is in the unlocked operating condition, torque is transmitted by the freewheeling unit only in the main driving direction of rotation.

When the freewheeling unit is in the locked operating condition, the locking elements in the apertures and recesses of the first and second drive element transmit torque when driving in the backwards direction. The locking elements transmit negative torque under pushing vehicle conditions, when driving in the forward direction, to eliminate the function of the clamping roller freewheeling unit. Such a freewheeling unit may be used in the propeller shaft of a motor vehicle. For example, at low vehicle speeds, the locking elements transmit torque when driving in the backwards direction and they transmit torque under pushing vehicle condition, when driving in the forward direction. At higher vehicle speeds, torque transmission when driving in the forward direction is taken up by the freewheeling unit to enable the rear axle to overtake during braking or under pushing vehicle conditions.

In one embodiment of the invention the control element is an axially adjustable shaft journal. The journal is coaxially guided in the first drive element and at one end includes a locking face. In a locking position, the locking face holds the locking elements radially outside, through the apertures of the first drive element, between the locking face and the corresponding recesses of the second drive element. The locking face, in a releasing position, enables the locking elements to enter an axially close hollow space, which as a result, releases the non-rotating connection between the first and second drive element.

According to a further embodiment of the invention, the first drive element and/or the second drive element is a shaft, a flange or a hollow shaft.

An advantage of the invention is that it achieves a compact design with the drive elements being supported coaxially inside each other. Also, the invention accommodates the freewheeling unit so that the freewheeling unit may be used even if only a small amount of installation space is available.

According to a further feature of the invention, the first drive element is connected to an outer ring of the freewheeling unit. The second drive element is provided with a joint yoke or a connecting flange. This achieves a compact design which is already provided with further drive elements.

According to a further embodiment of the invention, the control element is an axially adjustable sleeve with an internally positioned locking face. The control element is coaxially guided in the first drive element and, in a locking position, holds the locking elements radially inside or radially outside between the locking face and the recesses of the second drive element. In a releasing position, the locking face enables the locking elements to leave the recesses, which, as a result, releases the non-rotating connection between the first and second drive elements. The advantage of this design is that when the non-rotating connection is released, the locking elements cannot enter the recesses of the second drive element so that no noise can develop when a speed differential occurs.

According to a further embodiment of the invention, a second end of the control element is connected to a dish-shaped disc. The disc together with the end wall of the flange shaft forms a hollow space which is tapered towards the outside and which contains centrifugal masses. The centrifugal masses axially move the control element against the force of a spring when the predetermined speed is reached, which, as a result, releases the non-rotating connection.

The force of a spring holds the control element in the locking position. Only through the effect of the centrifugal forces, which moves the control element in the axial direction, when the speed of the drive elements exceeds a nominal speed is the releasing position achieved. When the vehicle reverses slowly or drives forward slowly, the returning force of the spring is greater than the axial force component generated by the centrifugal masses so that the control element is held in the locking position.

According to yet a further embodiment of the invention, it is proposed that opposite the aperture of the first drive element there should be provided circumferentially distributed recesses. Centrifugal masses are radially guided in the recess. In a region surrounding the centrifugal masses, the control element axially extends so as to be curved radially outwardly. The control element is axially movable against the force of a spring which, as a result, releases the non-rotating connection when the predetermined nominal speed is achieved.

Again, the locking elements are held in a locking position by a control element. The locking elements are always released when the nominal speed of the drive elements is exceeded and when, due to the effect of the centrifugal masses, the switching sleeve is moved axially. The centrifugal masses are guided in apertures of the first drive element and are pushed into the recesses of the second drive element by the locking face of the switching element, thereby allowing the transmission of torque via the locking elements. In a further embodiment, the locking elements are simultaneously designed as centrifugal masses. At the same time, the locking elements and/or the centrifugal masses may be designed as balls.

From the following detailed description taken in conjunction with the accompanying drawings and subjoined claims, other objects and advantages of the present invention will become apparent to those skilled in the art.

DETAILED DESCRIPTION OF THE DRAWINGS

FIG. 1 is a sectional view of a first embodiment of a freewheeling unit, in accordance with the present invention.

FIG. 2 is a sectional view of an embodiment of the present invention according to FIG. 1 with universal joint yokes formed on at a shaft.

FIG. 3A is a sectional view of an embodiment of the present invention according to FIG. 1 with a connecting flange formed on at a shaft.

FIG. 3B is a sectional view through line 3B—3B of FIG. 3A.

FIG. 4b is a sectional view through line 4B—4B of FIG. 4a.

FIG. 5 is a sectional view of another embodiment of a freewheeling unit in accordance with the present invention.

FIG. 6 is a diagram indicating the axial force acting on the switching element as a function of the radial path of the centrifugal masses.

DETAILED DESCRIPTION OF THE PREFERRED EMBODIMENTS

Figure 4A:
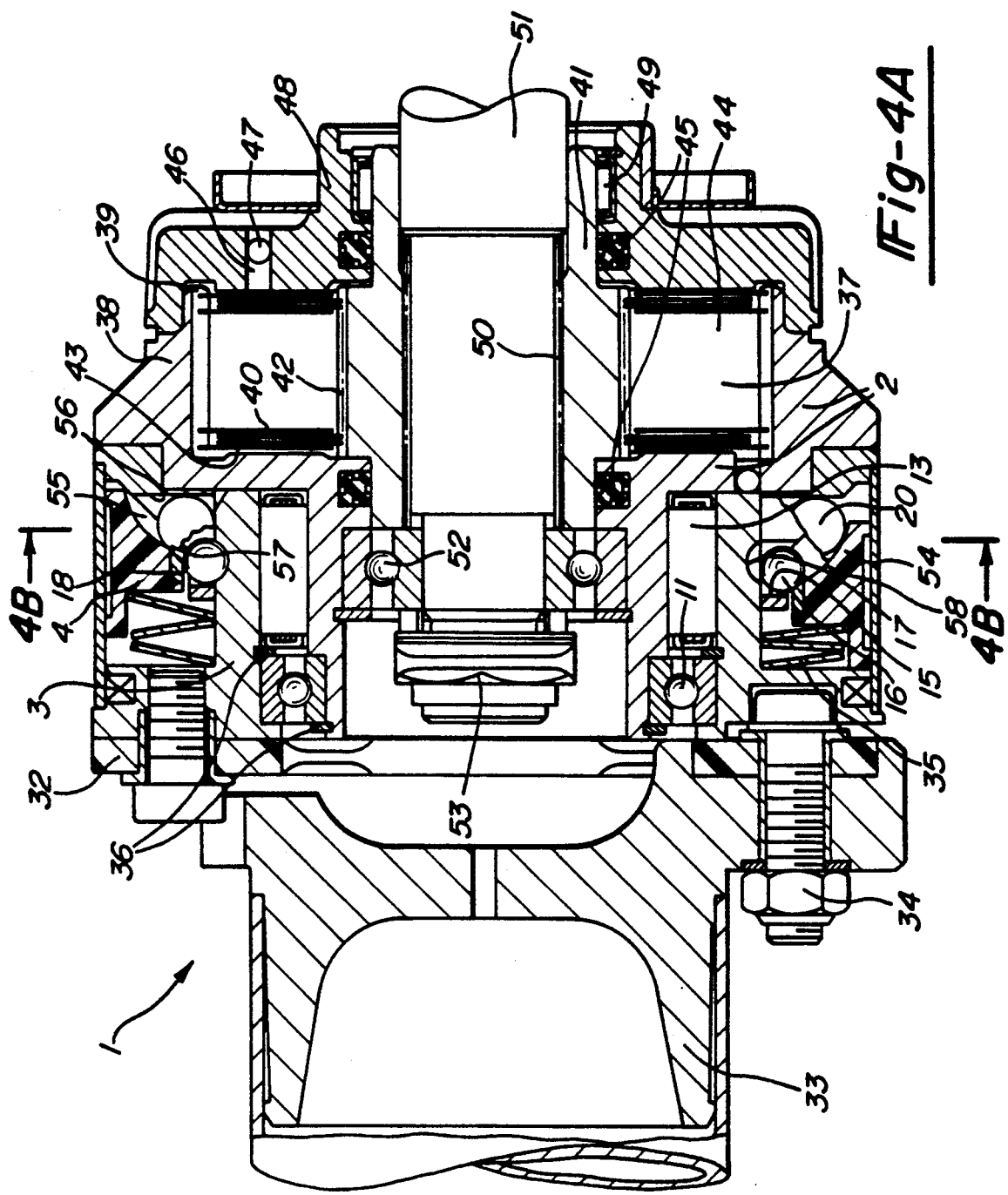
FIG. 4a is a sectional view of another embodiment of a freewheeling unit having an integrated viscous coupling in accordance with the present invention.

FIGS. 1 to 3 show a freewheeling unit 1 having a first drive element 2, a second drive element 3 and a device 4 for locking the freewheeling unit 1. With this embodiment, the first drive element 2 is designed as a driven shaft flange and the second drive element 3 as a driving shaft flange, with the first shaft flange 2 being designed in several parts.

In FIG. 1, the first shaft flange 2 includes a cover 5, a flange shaft 6 and an outer ring 7. These parts are connected to each other by a bolt. The flange shaft 6 includes a journal 8 which is formed at one end and which is coaxially arranged inside the outer ring 7. The flange shaft 6 and cover 5 form a hollow space 9 to receive a control element 10. The journal 8 of flange shaft 6 is rotatably supported relative to the second shaft flange 3 via ball bearings 11.

The second shaft flange 3 has a radially stepped connecting region 12. The shaft flange 3 via clamping rollers 13 is non-rotatingly connectable to the outer ring 7 in one driving direction of rotation. The main driving direction of rotation is referred to as the forward driving of the vehicle. The clamping rollers 13 effective in one direction of driving, if necessary, permit a higher speed of rotation of the second shaft flange 3 to permit the indirectly driven axle to overtake relative to the directly driven axle. The clamping rollers 13 are provided with a seal 14 to prevent any dirt from penetrating the outside.

The journal 8 of the first shaft flange 2 is provided with at least one, preferably a plurality, of circumferentially distributed apertures 15. Radially displace guiding locking elements 16 in the form of balls are positioned in each aperture. The locking elements 16, in their outer radial position, each engage a recess 17 of the second shaft flange 3 to produce a non-rotating connection between the first shaft flange 2 and the second shaft flange 3. If there exists a non-rotating connection between the two shaft flanges 2, 3, torque transmission via the locking elements 16 is possible in both directions; i.e. from the directly driven axle to the indirectly driven axle and vice versa. The recess 17 of the second shaft flange may consist for example of a longitudinal groove or a spherical or calotte-shaped aperture, with the locking elements 16 being held in the outer radial position by a locking face 18 of a control element 10.

The control member 10 is axially movable and guided by a spring 19 in the hollow space 9. If the speed of rotation is below a predetermined nominal speed, the control element 10 is in a locking position, as illustrated in the upper half of FIG. 1. As speed of rotation of the freewheeling unit 1 increases, the centrifugal masses 20 move radially outwardly in a radially arranged hollow space 21 to move the control element 10 to its unlocked position as shown in the bottom half of FIG. 1. The hollow space 21 is limited by a radial face 22 of the flange shaft 6 and a dish-shaped disc 23. As a result of the outwardly tapered hollow space 21 the centrifugal forces of the centrifugal masses 20, when at split up, partly produce an axial force component which causes a displacement of the control element 10 against the force of the spring 19 into a releasing position of the locking elements 16. The locking elements 16 may now enter a hollow space 24 close to the axis of the flange shaft 6 to release the non-rotating connection between the first 2 and second shaft flange 3. The shifting point of the control element 10 may be determined by selecting a suitable spring constant of the spring 19. The spring constant is adapted to the existing centrifugal forces in such a way that a defined switch on and switch off point to lock the freewheeling unit 1 is achieved. The centrifugal forces with reference to the rotational axis D are linearly dependent on the radial position of the centrifugal masses 20 and have to be taken into account accordingly when making a choice.

The switching point may occur at a nominal speed, for example 25 km/h, so that above this speed, the locking elements 16 are released with only the clamping rollers 13 effective in one direction of rotation. Below the above speed, the control element 10 is pushed into the original position so that the locking elements 16 are pushed, via an inclined stop face 25, into the recesses 17 of the second shaft 3 and, for torque transmitting purposes, they are held in this position by the locking face 18. This corresponds to the desired locking of the freewheeling unit 1 at low speeds, with the directly and indirectly driven axles of the vehicle being rigidly coupled in both vehicle driving directions.

FIGS. 2 and 3 differ from FIG. 1 in respect of the design of the first drive element 2 and the second drive element 3. The first drive element 2 is a hollow shaft which is connected, e.g. glued, welded or bolted to an outer ring 26 of the freewheeling unit. The outer ring 26 is welded to a shaft piece which replaces the flange shaft 6 of FIG. 1. The drive element 2 is also enclosed by a cover 5. The inner ring of the freewheeling unit is formed by the second drive element 3. The second drive element 3 is designed as a hollow shaft and at its end pointing outwardly, includes a joint yoke 27, as illustrated in FIG. 2, or a connecting flange 28 with a fixing bore 29 as illustrated in FIG. 3. The control element 30 is provided with a coaxially arranged sleeve which includes the locking face 18 and the inclined stop face 25. The sleeve is supported in a recess 31 of the control element 30.

FIG. 4 shows a second embodiment of the freewheeling unit 1 having a locking device 4. Via a flange disc 32, the second drive element 3 of the freewheeling unit 1 is bolted to a driveshaft 33 and fixing bolts 34. The second drive element 3 also comprises recesses 17 into which the locking elements 16 may enter to non-rotatingly connect to the first drive element 2 via circumferentially distributed clamping rollers 13. Both drive elements 2, 3 are rotatably supported relative to each other via a ball bearing 11 which is held in a stationary position via two clamping rings 36.

Furthermore, at one end, for the purpose of receiving a viscous coupling 37, the second drive element 3 comprises an extension 38 which at the same time constitutes the outer part of the viscous coupling 37. Via teeth 39, the extension 38 is non-rotatingly connected to the outer plates 40 of the viscous coupling 37. An inner part 41 of the viscous coupling 37, via teeth 42, is non-rotatingly connected to the inner plates 43 of the viscous coupling 37. The inner plates 43 and outer plates 40 of the viscous coupling 37 are alternately connected in an inner space 44 which is at least partially filled with a viscous fluid and sealed by sealing rings 45. The inner space 44 is filled through a bore 46 which is also sealed by an 0-ring 47. At its end, the viscous coupling 37 is covered by a cover 48. The inner part 41 of the viscous coupling 37 is rotatably supported relative to the cover 48 via a roller bearing 49. An inner bore of part 41 includes teeth 50 to receive corresponding teeth of an output shaft 51. Via a ball bearing 52, the output shaft 51 is rotatably supported relative to the first drive element 2 and is held in the inner part 41 of the viscous coupling 37 by a bolted connection 53.

The locking device 4 in this case includes a control element 54 in the form of an axially movable sleeve. The sleeve is positioned coaxially outside of the second drive element 3 and comprises an internally positioned locking face 18 to displace the locking elements 16. The locking elements 16 are radially displaceable in the circumferentially distributed apertures 15 of the first drive element 2. By moving the control element 54, the locking elements 16 enter the recesses 17 of the second drive element 3 as illustrated in the upper half of FIG. 4. The control element 54 is held in this position by a spring 35 until the predetermined nominal speed of the freewheeling unit 1 has been reached. Axial displacement of the control element 54 against the force of spring 35 is also effected by the centrifugal masses 20, which, relative to the locking elements 16, are held so as to be circumferentially offset in the recesses 55. In this case, the recesses 55 are limited by the radial face 56 and an axial face 57 of the first drive element 2 and by a conical or arched face 58 of the control element 54. In consequence, the recesses 55 are curved axially extended radially outwardly in a way so that under the influence of the centrifugal force, with an axial force component acting on the sleeve, displacement and release of the locking elements 16 are achieved. FIG. 4a shows the locking elements 16 and the centrifugal masses 20 arranged to be offset. The relative accurate circumferentially offset positions are shown in FIG. 4b which is a section along the connecting line A—A.

Furthermore, it is conceivable for the locking elements 16 themselves to be designed as the centrifugal masses in order to achieve a displacement of the control element 54 and its simultaneous exit from the recess 17 of the second drive element 3, as illustrated in FIG. 5. In FIG. 5, the first drive element 2 is designed as a hollow shaft and connected, e.g. glued, welded or bolted, to the outer ring 26 of the freewheeling unit. The inner ring of the freewheeling unit is formed by the second drive element 3 which is coaxially slid into the first drive element 2 and rotatably supported therewith via a ball bearing 11. The second drive element 3 comprises circumferentially distributed recesses 17. The locking elements 16, designed as centrifugal masses, may enter into recesses 17. The radially displaceable locking elements 16 are held in a recess 59. The recess 59 is formed by a radial face 60 of the outer ring 26 of the freewheeling unit, by an axial face 61 of the cover 5 and by a conical locking face 18 of the sleeve 54. The control element 54 is loaded by a spring 62. The spring 62 is displaced by the locking elements 16 under the effect of a centrifugal force. In this case, the control element 54 is guided on a cylindrical outer face 63 of the second drive element 3. The clamping rollers 13 are arranged as illustrated in FIG. 3.

FIG. 6 shows a force/travel diagram indicating the axial force acting on the control element 10, 30, 54 as a function of the radial travel of the centrifugal masses 20 and of the linearly extending spring force of the springs 19, 35 or 62. Curve 64 refers to the centrifugal force at a speed of 30 km/h, for example, and curve 65, with a different gradient, refers to the centrifugal force at a speed of 24 km/h. Curve 66 refers to the spring force so that the hatched region 68 above the curve 66 illustrates the spring force so that the hatched region 67 below the curve 66 illustrates the spring force available for closing the locking device 4 and the region 68 above the curve 66 illustrates the force available for opening purposes. The points of intersection of the curves 64, 65 with the characteristic spring curve 66 constitute the switching points of the device 4. By selecting the characteristic spring curve, it is possible to determine a defined switching on point and switching off point of the device 4.

While the above detailed description describes the preferred embodiment of the present invention, the invention is susceptible to modification, variation, and alteration without deviating from the scope and fair meaning of the subjoined claims.

We claim:

1. A lockable freewheeling unit comprising:
   freewheeling means for non-rotatingly connecting a first drive element and a second drive element against relative rotation between them in one direction and to disengage said first drive element from said second drive element for relative rotation between them in an opposite direction, said freewheeling means including:
   an outer ring connected to one of said first and second drive elements, having an internal circumferential surface, an inner ring connected to the other of said first and second drive elements, having an outer circumferential surface lying within said internal circumferential surface;
   clamping elements being held between and in contact with said internal and said outer circumferential surfaces;
   at least one coupling means for providing a non-rotating connection between said outer ring and said inner ring in one driving direction of rotation whether said freewheeling unit is locked or unlocked by said coupling means, said coupling means including:
   at least one locking element, said at least one locking element associated with said circumferential surface of said outer and inner rings for providing a non-rotating connection between said first and second drive elements;
   control means for controlling movement of said at least one locking element such that said control means displaces said at least one locking element between a position in contact with said circumferential surface of said outer and inner rings and a position in contact with said circumferential surface of at least one of said outer and inner ring such that the freewheeling unit is locked and unlocked by said locking element, said control means having a locking face for displacing said at least one locking element and radially displaceable centrifugal masses axially displacing said control means when only a predetermined nominal speed is exceeded and releasing the non-rotating connection between said first and second drive elements.

2. The freewheeling unit according to claim 1 wherein said control means includes an axially movable spring-loaded control element positioned coaxially relative to said first and second drive elements, said control element having a locking face for displacing said at least one locking element and radially displaceable centrifugal masses axially displacing said control element when a predetermined nominal speed is exceeded and releasing the non-rotating connection between said first and second drive elements.

3. The freewheeling unit according to claim 2 wherein said control element is an axially adjustable shaft journal which is coaxially guided in said first drive element and at one end includes a locking face which, in a locked position, holds said at least one locking element in contact with said at least one receiving element of said first and second drive elements, and which, in an unlocked position, enables said at least one locking element to enter an axially close hollow cavity which, as a result, releases the non-rotating connection between said first and second drive elements.

4. The freewheeling unit according to claim 1 wherein said first drive element and said second drive element are shafts.

5. The freewheeling unit according to claim 1 wherein said first and second drive elements are coaxially supported one inside the other.

6. The freewheeling unit according to claim 1 wherein said first drive element is connected to an outer ring of the freewheeling unit and said second drive element is provided with a joint yoke or a connecting flange.

7. The freewheeling unit according to claim 2 wherein said control element is an axially adjustable sleeve with an internally positioned locking face which is coaxially guided in said inner ring and, in a locked position, positions said at least one locking element radially outside of said inner ring with said locking element held between the locking face and said circumferential surface of said outer ring, and which locking face, in a released position, enables said at least one locking element to leave said circumferential surface of said outer ring, which as a result, releases the non-rotating connection between said outer and inner ring.

8. The freewheeling unit according to claim 2 wherein a second end of said control element is connected to a dish-shaped disc which, together with a radial shaft of a flange shaft, forms a hollow space which is tapered towards the outside and which contains said centrifugal masses which axially move the control element against the force of a spring which as a result releases said non-rotating connection.

9. The freewheeling unit according to claim 2 wherein said at least one receiving elements of said first and second drive elements further comprise a plurality of apertures circumferentially distributed in said first drive element and opposite said apertures, a plurality of circumferentially distributed recesses in said second drive element, said centrifugal masses are guided radially and that in a region surrounding the centrifugal masses, said control element axially extends so as to be curved radially outwardly and said control element is axially movable against force of a spring which, as a result releases said non-rotating connection.

10. The freewheeling unit according to claim 2 wherein said at least one locking element is simultaneously designed as said centrifugal masses.

11. The freewheeling unit according to claim 10 wherein said at least one locking element and centrifugal masses are balls.

12. The freewheeling unit according to claim 10 wherein said at least one locking element is a ball.

13. The freewheeling unit according to claim 1 wherein said first drive element and said second drive element are flanges.

14. The freewheeling unit according to claim 1 wherein said first drive element and said second drive element are hollow shafts.

15. The freewheeling unit according to claim 10 wherein said centrifugal masses are balls.

* * * * *